United States Patent
Nakajima et al.

(10) Patent No.: US 6,207,600 B1
(45) Date of Patent: *Mar. 27, 2001

(54) FIBERS AND FIBROUS MOLDINGS MADE BY USING THE SAME

(75) Inventors: Yuji Nakajima, Moriyama; Morio Abe, Yasu-gun, both of (JP)

(73) Assignee: Chisso Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/117,329

(22) PCT Filed: Nov. 28, 1997

(86) PCT No.: PCT/JP97/04366

§ 371 Date: Jul. 24, 1998

§ 102(e) Date: Jul. 24, 1998

(87) PCT Pub. No.: WO98/23799

PCT Pub. Date: Jun. 4, 1998

(30) Foreign Application Priority Data

Nov. 29, 1996 (JP) .................................... 8-334829
Dec. 3, 1996 (JP) .................................... 8-337557

(51) Int. Cl.⁷ .............................. D04B 1/14; D04B 21/14
(52) U.S. Cl. .................... 442/311; 442/199; 442/361; 442/400; 442/401; 428/373; 526/89; 526/90
(58) Field of Search ............................ 428/373; 442/199, 442/361, 400, 401, 311; 526/89, 90

(56) References Cited

U.S. PATENT DOCUMENTS 4,933,403  *  6/1990  Kaminsky et al. ................. 526/160

FOREIGN PATENT DOCUMENTS

| 0 629 632 | 12/1994 | (EP) . |
| 0 748 824 | 12/1996 | (EP) . |
| 60-59113 | * 4/1985 | (JP) . |
| 5-230754 | * 9/1993 | (JP) . |
| 6-207310 | * 7/1994 | (JP) . |
| 8-27625 | * 1/1996 | (JP) . |
| 9-48820 | * 2/1997 | (JP) . |

* cited by examiner

Primary Examiner—Terrel Morris
Assistant Examiner—Arti Singh
(74) Attorney, Agent, or Firm—Fay, Sharpe, Fagan, Minnich & McKee, LLP

(57) ABSTRACT

The present invention provides a fiber containing remarkably high heat resistance and softness and fiber-processed products using the same.

A fiber formed from a polypropylene serving as at least one raw material, wherein the polypropylene is confirmed with NMR spectrometry that an isotactic pentad fraction (mmmm) of 0.950–0.995, a syndiotactic pentad fraction (rrrr) of 0–0.004, different bonds due to 2,1-insertion reaction and 1,3-insertion reaction in an amount of 0–0.3 mol %, and absence of terminal double bonds, and has a weight average molecular weight (Mw) of 50,000–1,000,000, and has a ratio (Mw/Mn) of weight average molecular weight (Mw) to number average molecular weight (Mn) of 1.5–3.8; and fiber-processed products using the fiber.

20 Claims, No Drawings

FIBERS AND FIBROUS MOLDINGS MADE BY USING THE SAME

FIELD OF THE INVENTION

The present invention relates to fiber formed of specific polypropylene and to fiber-processed products using the same. More particularly, the present invention relates to fiber widely applicable to hygienic materials such as sanitary napkins and disposable diapers, filter materials such as those for air and liquid, agricultural materials such as insect netting, or reinforcing materials for concrete; and to fiber-processed products using the same.

BACKGROUND

Conventionally, polypropylene fiber has widely been used in the field of hygienic materials such as surface materials of disposable diapers, since it is lightweight, has excellent heat-retaining properties and softness, and is significantly advantageous in balance between performance and economy. In recent years, non-woven fabrics having physical properties of even higher toughness and softness are demanded for hygienic materials.

In order to obtain non-woven fabrics having higher toughness, melt-adhesion of polypropylene fibers must be improved. To this end, non-woven fabrics must be processed under conditions of high temperature so as to satisfactorily soften polypropylene fibers upon melt-adhesion of the non-woven fabrics by way of heat-rolling. However, high-temperature processing of non-woven fabrics thermally affects part of polypropylene fibers other than melt-adhesion sites to produce non-woven fabrics having sufficient tenacity but decreased softness. In contrast, low-temperature processing of non-woven fabrics results in poor melt-adhesion, and tenacity of the obtained non-woven fabric becomes low. There is also a problem that, when used under high-temperature conditions, non-woven fabrics or processed products thereof such as cylindrical filters have poor durability, decreased shape-retention, and decreased rigidity.

As described above, processing and use of conventional polypropylene fiber at high temperature are restricted due to the disadvantage of low heat resistance, and therefore improvement of performance of polypropylene fiber is strongly desired for development of further uses.

Moreover, conventional polypropylene fiber is difficult to be made micro-fine on account of the occurrence of fuming or thread breakage during spinning due to low-molecular-weight components contained in the polymer, and the level of ultra-fining is therefore limited.

Japanese Patent Application Laid-Open (kokai) No. 62-156310 discloses a polypropylene fiber endowed with excellent properties for heat-roll processing and formed of an ethylene-propylene random copolymer containing ethylene in a specific amount and having a softening point of 132° C. or less. However, non-woven fabric made of this fiber has disadvantages of poor softness and a narrow temperature range that enables processing into non-woven fabrics having tenacity and softness suited for actual use.

Meanwhile, in recent years, J. A. Ewen et al. have found that syndiotactic polypropylene having a narrow molecular weight distribution and a high syndiotactic pentad fraction is obtained through polymerization of propylene by combined use of an asymmetric transition metal catalyst which differs from a conventional Ziegler catalyst and a metallocene catalyst comprising aluminoxane (J. Am. Chem. Soc., 110, 6255 (1989)). In connection with the metallocene catalyst, Japanese Patent Application Laid-Open (kokai) No. 3-82814 discloses a fiber formed of syndiotactic polypropylene having a syndiotactic pentad fraction of 0.7 or more. The polypropylene fiber disclosed therein is endowed with excellent softness, but heat resistance during melt-adhesion of fiber-bonding sites is particularly inferior to that of conventional polypropylene fibers.

Accordingly, no polypropylene fiber having satisfactory tenacity and softness has yet to be developed.

DISCLOSURE OF THE INVENTION

In view of the foregoing, an object of the present invention is to provide a fiber and fiber-processed products exhibiting lightweight and soft qualities possessed by polypropylene fiber per se and having improved heat-resisting properties.

The present inventors have conducted earnest studies to overcome the aforementioned drawbacks, and have found that fiber manufactured from polypropylene which has no double bond, has substantially no singular bond, has a narrow molecular weight distribution, and has remarkably high stereoregularity has remarkably high heat resistance, satisfactory tenacity and softness, and good spinning stability, to thereby attain the object of the invention while solving the above-mentioned problems.

The present invention is directed to the following aspects.

(1) A fiber formed from a polypropylene serving as at least one raw material, wherein the polypropylene is confirmed with NMR spectrometry that (a) an isotactic pentad fraction (mmmm) of 0.950–0.995, (b) a syndiotactic pentad fraction (rrrr) of 0–0.004, (c) different bonds due to 2,1-insertion reaction and 1,3-insertion reaction in an amount of 0–0.3 mol %, and (d) absence of terminal double bonds, and has (e) a weight average molecular weight (Mw) of 50,000–1,000,000, and has (f) a ratio (Mw/Mn) of weight average molecular weight (Mw) to number average molecular weight (Mn) of 1.5–3.8.

(2) A fiber according to (1), wherein the polypropylene has (a) an isotactic pentad fraction (mmmm) of 0.960–0.995, (b) a syndiotactic pentad fraction (rrrr) of 0–0.004, and (c) different bonds due to 2,1-insertion reaction and 1,3-insertion reaction in an amount of 0–0.2 mol %.

(3) A fiber according to (1), wherein the polypropylene is manufactured through use of at least one catalyst selected from among dimethylsilylene(2,3,5-trimethylcyclopentadienyl)(2', 4',5'-trimethylcyclopentadienyl)hafnium dichloride and dimethylsilylene(2,3,5-trimethylcyclopentadienyl)(2', 4',5'-trimethylcyclopentadienyl)zirconium dichloride.

(4) A fiber according to (1), wherein the polypropylene has a melting point of 160–168° C.

(5) A fiber according to any of (1) to (4), wherein the fiber is a composite fiber containing polypropylene as one component.

(6) A non-woven fabric in which the fiber according to any of (1) to (5) is employed.

(7) A non-woven fabric according to (6), wherein the non-woven fabric is long-fiber non-woven fabric obtained through a spun bond method.

(8) A non-woven fabric according to (6), wherein the non-woven fabric is long-fiber non-woven fabric obtained through a melt blow method.

(9) A knit fabric in which the fiber according to any of (1) to (5) is employed.

(10) A filter in which the fiber according to any of (1) to (5) is employed.

(11) A filter in which the non-woven fabric according to any of (6) to (8) is employed.

(12) An absorptive article partially using the non-woven fabric according to any of (6) to (8).

Best Modes for Carrying Out the Invention

The present invention will next be described in detail.

Among the characterization conditions of polypropylene as a raw material of the fiber of the present invention, the above-described (a), (b), (c), and (d) are determined based on the results of $^{13}C$ nuclear magnetic resonance spectrometry performed in accordance with the following method; i.e., measurement by use of a solution containing the polymer in a concentration of 20 wt. % dissolved in a mixture of o-dichlorobe nzene/bromobenzene (8/2, weight ratio) at 67.20 MHz and 130° C. As the measuring apparatus, a JEOL-GX270 NMR measuring apparatus (JEOL, Ltd.) may be used.

In the present invention, the words "isotactic pentad fraction (mmmm)" and "syndiotactic pentad fraction (rrrr)" respectively refer to isotactic fraction and syndiotactic fraction in a pentad unit of polypropylene molecular chains as determined through 13C nuclear magnetic resonance spectrometry, wherein the isotactic and syndiotactic fractions are proposed by A. Zambelli, et al. in "Macromolecules 6, 925 (1973)." Assignment of peaks in the $^{13}C$ nuclear magnetic resonance spectrometry was determined through a method proposed by A. Zambelli, et al. in "Macromolecules 8, 687 (1975)."

The isotactic pentad fraction (mmmm) described in the characterization condition "(a)" of the polypropylene serving as a raw material of the fiber of the present invention refers to the fraction of propylene monomer units forming meso linkages over five continuous units existing in the total propylene units of the polypropylene molecule. Consequently, the higher the isotactic pentad fraction (mmmm), the higher the isostaticity. The isostatic pentad fraction (mmmm) of the polypropylene of the present invention is 0.950–0.995, preferably 0.955–0.995, particularly preferably 0.960– 0.995.

The syndiotactic pentad fraction (rrrr) described in the characterization condition "(b)" of the polypropylene serving as a raw material of the fiber of the present invention refers to the fraction of propylene monomer units forming racemic linkages over five continuous units existing in the total propylene units of the polypropylene molecule. Consequently, the lower the syndiotactic pentad fraction (rrrr), the lower the syndiotacticity. The syndiotactic pentad fraction (rrrr) of the polypropylene of the present invention is 0–0.004.

In the present invention, the expression "different bonds due to 2,1-insertion reaction and 1,3-insertion reaction" represents the amount of different bonds due to 2,1-insertion reaction and 1,3-insertion reaction of a methyl group in polypropylene molecular chains, and the amount is determined through $^{13}C$ nuclear magnetic resonance spectrometry in accordance with a method described in Polymer, 30, 1350 (1989) proposed by T. Tsutsui et al.

The different bonds due to 2,1-insertion reaction and 1,3-insertion reaction described in the characterization condition "(c)" of the polypropylene serving as a raw material of the fiber of the present invention is 0–0.3 mol %, preferably 0–0.25, particularly preferably 0–0.2 mol. It has been known that polymerization of propylene by use of a known customary titanium catalyst proceeds via 1,2-insertion reaction, while specific degrees of 2,1-insertion reaction and 1,3-insertion reaction occur to thereby produce polypropylene containing a specific amount of singular bonds in the case in which a known metallocene catalyst is used.

Polypropylene satisfying the above-described characterization conditions (a) to (c) and forming the fiber of the present invention has almost no singular bonds or racemic linkage chains and exhibits remarkably high isotacticity attributed to remarkably highly regulated meso linkage chains.

In the present invention, by "terminal double bond" is meant the amount of double bonds existing in the ends of polypropylene molecular chains, and the amount is determined through $^{13}C$ nuclear magnetic resonance spectrometry performed in accordance with a method described in Polymer, 30, 1717 (1989) proposed by T. Hayashi et al.

The absence of a terminal double bond is the characterization condition "(d)" of the polypropylene serving as a raw material of the fiber of the present invention. When a polypropylene molecule has a double bond in one end, the double bond may participate in reactions depending on the usage conditions to thereby possibly result in decrease of chemical stability of polypropylene and therefore failure in development of characteristics of the polypropylene-containing fiber per se.

Among the characterization conditions of polypropylene serving as a raw material of the fiber of the present invention, weight average molecular weight (Mw) described in "(e)" and the ratio (Mw/Mn) of weight average molecular weight (Mw) to number average molecular weight (Mn) described in "(f)" are determined based on results of gel permeation chromatography (GPC) performed in accordance with the following method; i.e., by use of an o-dichlorobenzene solution containing the polymer having a concentration of 0.05 wt. %, and a polystyrene mixture gel column (e.g., PSKgel GMH6-HT, product of Tosoh Corp.) at 135° C. As the measuring apparatus, GPC-150C (Waters Co.) may be used.

The weight average molecular weight (Mw) described in the characterization condition "(e)" of the polypropylene as a raw material of the fiber of the present invention is 50,000–1,000,000, preferably 70,000–600,000.

The ratio (Mw/Mn) of weight average molecular weight (Mw) to number average molecular weight (Mn) described in the characterization condition "(f)" of the polypropylene serving as a raw material of the fiber of the present invention is 1.5–3.8, preferably 1.5–3.5, more preferably 1.8–3.0.

The above-described ratio (Mw/Mn) of weight average molecular weight (Mw) to number average molecular weight (Mn) is a yardstick of molecular weight distribution. When the ratio is large, the molecular weight distribution is wide, whereas when the ratio is small, the distribution is narrow.

The six characterization conditions of polypropylene serving as a raw material of the fiber of the present invention have been described, and the polypropylene of the present invention has a melting point of 160–168° C. attributed to these structural characteristics, particularly conditions (a) to (c). Depending on the structural conditions, the melting point of the polypropylene of the present invention may be 161–168° C. or 162–168° C.

As used herein, the melting point is defined as a temperature measured by use of a DSC7-type differential scanning calorimeter (Perkin-Elmar Co.) in the following operation: the temperature of polypropylene is elevated from ambient temperature to 230° C. at a rate of 30° C./minute; the polypropylene is maintained at 230° C. for 10 minutes, cooled to −20° C. at a rate of −20° C./minute; then maintained at −20° C. for 10 minutes, followed by heating at a rate of 20° C./minute and measuring the temperature that indicates a peak of melting.

In the present invention, no particular limitation is imposed on the method of manufacturing the polypropylene serving as a raw material so long as the polypropylene satisfies the above-described characterization conditions. The method of manufacturing polypropylene by use of a specific metallocene catalyst will next be described.

The metallocene catalyst used in the present method is a complex catalyst comprising a metallocene serving as a transition metal compound and aluminoxane.

Examples of the above-described metallocene which may be used include a chiral transition metal compound having the below-described formula $Q(C_5H_{4-m}R^1_m)(C_5H_{4-n}R^2_n)MXY$, wherein each of ($C_5H_{4-m}$ and $C_5H_{4-n}R^2_n$) represents a substituted cyclopentadienyl group; each of m and n represents an integer of 1–3; each of $R^1$ and $R_2$, which may be identical to or different from each other, represents a $C_{1-20}$ hydrocarbon group, a silicon-containing hydrocarbon group, or a hydrocarbon group bonding to two carbon atoms contained in the cyclopentadienyl ring to thereby form one or more hydrocarbon rings which may have ring hydrogen further substituted with a hydrocarbon group; Q represents a group that can be cross-linked with $C_5H_{4-m}R^1_m$ and $C_5H_{4-n}R^2_n$, i.e., a divalent hydrocarbon, non-substituted silylene, or hydrocarbon-substituted silylene group; M represents a transition metal selected from among titanium, zirconium, and hafnium; and each of X and Y, which may be identical to or different from each other, represents hydrogen, a halogen, or a hydrocarbon group.

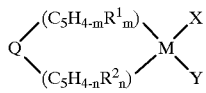

More preferably, there is used a chiral transition metal compound having the above-described formula, wherein each of $R^1$ and $R^2$, which may be identical to or different from each other, represents a $C_{1-20}$ alkyl group; Q represents a dialkylsilylene group; M represents a transition metal selected from zirconium and hafnium; and each of X and Y, which may be identical to or different from each other, represents a halogen or a hydrocarbon group.

Examples of such metallocenes include rac-dimethylsilylene bis(2-methyl-4,5,6,7-tetrahydroindenyl)zirconium dichloride,
rac-dimethylsilylenebis(2-methyl-4,5,6,7-tetrahydroindenyl)zirconium dimethyl,
rac-ethylenebis(2-methyl-4,5,6,7-tetrahydroindenyl)hafnium dichloride,
rac-dimethylsilylenebis(2-methyl-4-phenylindenyl)zirconium dichloride,
rac-dimethylsilylenebis(2-methyl-4-phenylindenyl)zirconium dimethyl,
rac-dimethylsilylenebis(2-methyl-4-phenylindenyl)hafnium dichloride,
dimethylsilylene(2,4-dimethylcyclopentadienyl)(3',5'-dimethylcyclopentadienyl)titanium dichloride,
dimethylsilylene(2,4-dimethylcyclopentadienyl)(3',5'-dimethylcyclopentadienyl)zirconium dichloride,
dimethylsilylene(2,4-dimethylcyclo-pentadienyl)(3',5'-dimethylcyclopentadienyl)zirconium dimethyl,
dimethylsilylene(2,4-dimethylcyclopentadienyl)(3',5'-dimethylcyclopentadienyl)hafnium dichloride,
dimethylsilylene(2,4-dimethylcyclopentadienyl)(3',5'-dimethylcyclopentadienyl)hafnium dimethyl,
dimethylsilylene(2,3,5-trimethylcyclopentadienyl)(2',4',5'-trimethylcyclopentadienyl)titanium dichloride,
dimethylsilylene(2,3,5-trimethylcyclopentadienyl)(2',4',5'-trimethylcyclopentadienyl)zirconium dichloride,
dimethylsilylene(2,3,5-trimethylcyclopentadienyl)(2',4',5'-trimethylcyclopentadienyl)zirconium dimethyl,
dimethylsilylene(2,3,5-trimethylcyclopentadienyl)(2',4',5'-trimethylcyclopentadienyl)hafnium dichloride, and
dimethylsilylene(2,3,5-trimethylcyclopentadienyl)(2',4',5'-trimethylcyclopentadienyl)hafnium dimethyl.

Of these metallocenes, particularly preferred ones are
dimethylsilylene(2,4-dimethylcyclopentadienyl)(3',5'-dimethylcyclopentadienyl)zirconium dichloride,
dimethylsilylene(2,4-dimethylcyclopentadienyl)(3',5'-dimethylcyclopentadienyl)zirconium dimethyl,
dimethylsilylene(2,4-dimethylcyclopentadienyl)(3',5'-dimethylcyclopentadienyl)hafnium dichloride,
dimethylsilylene(2,4-dimethylcyclopentadienyl)(3',5'-dimethylcyclopentadienyl)hafnium dimethyl,
dimethylsilylene(2,3,5-trimethylcyclopentadienyl)(2',4',5'-trimethylcyclopentadienyl)zirconium dichloride,
dimethylsilylene(2,3,5-trimethylcyclopentadienyl)(2',4',5'-trimethylcyclopentadienyl)zirconium dimethyl,
dimethylsilylene(2,3,5-trimethylcyclopentadienyl)(2',4',5'-trimethylcyclopentadienyl)hafnium dichloride, and
dimethylsilylene(2,3,5-trimethylcyclopentadienyl)(2',4',5'-trimethylcyclopentadienyl)hafnium dimethyl.

Incidentally, a meso-form metallocene having a structure exhibiting no chirality may be formed as a by-product during the synthesis of these chiral metallocene. None of these metallocenes are required to be chiral in actual use, and a meso form thereof may be mixed within a range that attains the objects of the present invention. When a mixture containing a meso form thereof is used, atactic polypropylene generated through polymerization via a meso-form metallocene sometimes must be removed through a known method such as solvent extraction, depending on the amount of meso form and activity for polymerization of propylene, so that the polypropylene to be obtained satisfies requirements of the present invention.

These chiral metallocenes may directly serve as a catalyst in combination of aluminoxane or may be used with a microgranular carrier. As such a grain carrier there may be used a granular or spherical microgranular solid of inorganic or organic compounds having a grain size of 5–300 μm, preferably 10–200 μm.

Of these, examples of inorganic compounds used as the carrier include $SiO_2$, $Al_2O_3$, MgO, $TiO_2$, ZnO, and mixtures thereof such as $SiO_2$—$Al_2O_3$, $SiO_2$—MgO, $SiO_2$—$TiO_2$, or $SiO_2$—$Al_2O_3$—MgO, among which a mixture mainly containing $SiO_2$ or $Al_2O_3$ is preferred.

Examples of organic compounds used as the carrier include a $C_{2-12}$ α-olefin polymer or copolymer such as ethylene, propylene, 1-butene, or 4-methyl-1-pentene. In addition, a styrene polymer or copolymer may also be used.

Aluminoxane, used as a catalyst component in combination of a metallocene for manufacture of the polypropylene serving as a raw material of the fiber of the present invention, is an organic compound represented by formula [1] or formula [2]:

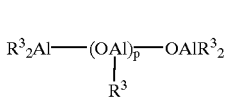

[1]

-continued

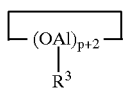
[2]

wherein R3 represents a hydrocarbon group having 1–6, preferably 1–4 carbon atoms, e.g., an alkyl group such methyl, ethyl, propyl, butyl, isobutyl, pentyl, or hexyl; an alkenyl group such as allyl, 2-methylallyl, propenyl, isopropenyl, 2-methyl-1-propenyl, or butenyl; a cycloalkyl group such as cyclopropyl, cyclobutyl, cyclopentyl, or cyclohexyl; or an aryl group. Of these, an alkyl group is particularly preferred, and each of $R^3$ may be identical to or different from one another.

p is an integer of 4–30, preferably 6–30, particularly preferably 8–30.

The aluminoxane may be used singly or in combination of two or more species, and the aluminoxane may be used with alkylaluminum compounds such as trimethylaluminum, triethylaluminum, triisopropylaluminum, triisobutylaluminum, or dimethylaluminum chloride.

The above-described aluminoxanes may be prepared under known conditions. Specifically, mention may be given of the following methods:

(1) a method in which trialkylaluminum is directly reacted with water by use of an organic solvent such as toluene or ether;

(2) a method in which trialkylaluminum is reacted with salts containing water of crystallization (e.g., copper sulfate hydrate or aluminum sulfate hydrate);

(3) a method in which trialkylaluminum is reacted with water contained in silica gel, etc.;

(4) a method in which trimethylaluminum and triisobutylaluminum are mixed and direct reaction thereof with water is effected by use of an organic solvent such as toluene or ether;

(5) a method in which trimethylaluminum and triisobutylaluminum are mixed and reaction thereof with salts containing hydration water, e.g., copper sulfate hydrate or aluminum sulfate hydrate, is effected; and (6) a method in which silica gel, etc. are impregnated with water and successive reaction of water with triisobutylaluminum and trimethylaluminum is effected.

The catalyst employed for the manufacture of the propylene as a raw material of the fiber of the present invention is a catalyst comprising the above-described metallocene and aluminoxane in combination. Each of the catalyst components is used in an amount of 10–100,000 mol, preferably 50–50,000 mol, particularly preferably 100–30,000 mol, of aluminum atoms in aluminoxane with respect to 1 mol of transition metal atoms in metallocene.

The propylene serving as a raw material of the fiber of the present invention is obtained through polymerization of propylene in the presence of hydrogen by use of the thus-combined catalyst. Known polymerization processes for propylene may be employed, and examples include slurry polymerization wherein propylene is polymerized in an inert solvent, which examples include aliphatic hydrocarbons such as butane, pentane, hexane, heptane, or isooctane; alicyclic hydrocarbons such as cyclopentane, cyclohexane, and methylcyclohexane; aromatic hydrocarbons such as toluene, xylene, and ethylbenzene; and fractions of gasoline or hydrogenated diesel oil; bulk polymerization using propylene also as a solvent; and vapor phase polymerization wherein propylene is polymerized in vapor phase.

The metallocene component and aluminoxane component of the above-described catalyst may be fed as a mixture obtained through pre-mixing both components in an inert solvent or may be fed individually at polymerization of propylene. Furthermore, a combination catalyst of metallocene and aluminoxane may be pre-activated through polymerization of a-olefin in a specific amount of approximately 1 g to 10 kg per 1 mol of a transition metal in metallocene in an inert solvent prior to main polymerization of polypropylene, and then the main polymerization is conducted. This process is effective in that polypropylene having good grain shape is ultimately obtained.

Examples of α-olefins which are preferably used for the above-described pre-activation include $C_{2-12}$ α-olefin such as ethylene, propylene, butene, pentene, hexene, octene, and 4-methyl-1-pentene; with ethylene, propylene, and 4-methyl-1-pentene being particularly preferred.

The thus-prepared catalyst used in the present invention or the thus-pre-activated catalyst is used for polymerization of propylene by the aforementioned polymerization method, and there are employed polymerization conditions similar to those employed for polymerization of propylene by use of a typically known Ziegler catalyst. Specifically, polymerization is conducted in the presence of hydrogen at a polymerization temperature of –50–150° C., preferably –10–100° C., and a polymerization pressure of atmospheric to 7 MPa, preferably 0.2 Mpa–5 Mpa, for one minute to 20 hours. The suitable amount of hydrogen is 0.01 kPa–5 MPa, preferably 0.1 kPa–3 Mpa, as partial pressure of hydrogen in a polymerization reactor.

The polypropylene serving as a raw material of the fiber of the present invention is obtained through optional post-treatment steps such as deactivation treatment of a catalyst, removal of catalyst residues, and drying, performed after termination of polymerization of propylene. The obtained polypropylene must satisfy the above-described six characterization conditions; otherwise the objects of the present invention cannot be attained.

That is, the fiber of the present invention is not always obtained even though there is employed polypropylene resins obtained through use of the above-described metallocene under the above-described polymerization conditions. The optimum polymerization conditions need to be selected when a certain type of metallocene is used. Comparatively low polymerization temperatures are often employed as the optimum polymerization conditions included within the constraints of the above-described polymerization conditions.

Into polypropylene serving as a raw material of the fiber of the present invention, there may be incorporated additives such as an antioxidant, a UV-absorbing agent, an antistatic agent, a nucleating agent, a lubricant, a fire-proofing agent, an anti-blocking agent, a colorant, an inorganic or organic filler, and an additional synthetic resin according to needs. The mixture is supplied as polypropylene, in the form of powder or pellets obtained through thermally melting and kneading at 190–350° C. for 20 seconds to 30 minutes by use of a melt-kneader, and is further cut into granular shapes.

The fiber of the present invention may be formed through mixing optional polypropylene resins having different molecular weight distributions or having approximately identical molecular weight distributions and different weight average molecular weights other than the polypropylene specified in the present invention, and processing such polypropylene resins into fiber.

Examples of the fiber processing include known spinning methods such as a melt spinning method, a spun bond method, and a melt blow method, with a melt blow method being suited particularly in the case in which target fineness is micro-fine. These processing methods may yield forms such as multi-filament, mono-filament, staple fiber, tow, web, non-woven fabric, and knit fabric.

No particular limitation is imposed on the fineness of the fiber, and it may be appropriately selected according to physical properties of polypropylene used or uses of the fiber. Specifically, it is preferably 0.1–10 d/f for hygienic materials including, for example, surface materials of absorbable articles such as disposable diapers and sanitary napkins, and clothes and covers for a surgical operation; 8 d/f–80 d/f for needle-punched or tufted carpets; and 50–7,000 d/f for civil engineering materials such as mono-filament. Micro-fine fibers having a fineness of approximately 0.1–15 µm are preferred for filters for microfiltration.

The fiber of the present invention may be imparted with crimps if desired.

When the fiber of the present invention is short fiber having a length of 20 mm or more, fiber web such as random web, parallel web, or cross-wrap web is manufactured through processing by use of a card or a random webber, whereas when the fiber is short fiber having a length of less than 20 mm, fiber web is manufactured through an air-lay method or a paper-making method.

In order to align fibers with the running direction of non-woven fabric, the fiber length in the case in which the fibers are passed through a card or a random webber is preferably 30–150 mm, more preferably 50–130 mm, in consideration of card-passage characteristics.

The obtained web may be formed into a non-woven fabric through known methods for processing into non-woven fabric, such as a needle-punching method, a heat roll processing method, a method making use of a hot air dryer, a method making use of an ultrasonic melt-adhesion apparatus, or a high-pressure water-jet method, and a plurality of these methods for processing into non-woven fabric may be combined.

The fiber of the present invention may be used as long fiber web obtained through a spun bond method, a melt blow method, etc. The long fiber web may be formed into non-woven fabric through the above-described methods for processing to non-woven fabric. A basis weight of the non-woven fabric of the present invention is suitably chosen according to purpose of use. It is preferably 5–50 g/M$^2$ when the non-woven fabric is used for surface materials of absorbable articles and 50–2,000 g/m$^2$ when the non-woven fabric is used for civil engineering materials such as drain materials. Synthetic fiber such as polyester, natural fiber such as wool, and regenerated fiber such as rayon may be mixed with the fiber of the present invention within the range that attains the objects of the present invention.

The fiber of the present invention may be formed into primary fiber products such as knit fabric and fiber-processed products, singly or in combination with another fiber, through mix spinning with cotton, mix spinning, combining filament, cross-knitting, cross-combining of filament, etc.

The fiber of the present invention may also be manufactured by use of polypropylene used in the present invention as at least one component of raw materials and, as other components, polypropylene used in the present invention or other thermoplastic resins, and may be formed into composite fiber such as fiber of the side-by-side type, sheath-core type, eccentric sheath-core type, or hollow type. Examples of other thermoplastic resins include polyolefin-based resins, polyester-based resins, and polyamide-based resins; specifically, polypropylene, high-density polyethylene, linear low-density polyethylene, ethylene/propylene bicomponent copolymers, ethylene/butene-1/propylene terpolymers, polyethylene terephthalate, polybutylene terephthalate, low-melting point polyester such as compolymers of diol and terephthalic acid/isophthalic acid, Nylon 6, and Nylon 66. The compositional ratio of the composite fiber may arbitrarily be selected. The fiber of the present invention exhibits significant effect of the present invention when it contains the polypropylene specified in the present invention in an amount of 30 wt. % or more in the fiber, more preferably 50 wt. % or more. The effect of the present invention is maximized by use of the polypropylene specified in the present invention and no other thermoplastic resins.

The primary products are secondarily processed to serve a wide range of use fields including clothing such as underwear, shirts, blouses, socks, tabi (Japanese socks), and panty hoses; bedding and bedclothes such as wadding, quilting, sheets, bedcovers, pillowcases, and kneeling cushions; medical materials such as surgery masks, surgery robe, caps, white overalls, gauze, and bandages; hygienic materials such as sanitary articles, disposable diapers, and incontinence pads; interior materials such as carpets, curtains, and wallpapers; footgear materials such as lining materials, insoles, and materials for footwears; horticulture materials such as fruit protection materials and insecticidal materials; materials for daily necessities such as wrapping materials for sweets and foods, furoshiki wrappers, towels, oshibori (wetted hand-towels), brushes, tablecloths, aprons, clothes and gloves for kitchen use, cosmetic puff, tea bags, and wiping cloths; civil engineering materials such as concrete reinforcement materials and drain materials; and filter materials such as air filters, tobacco filters, and liquid filters.

The present invention will next be described specifically by way of examples, which should not be construed as limiting the invention. The definition of terms and measuring methods used in Examples and Comparative Examples are described as follows:

1) Isotactic pentad fraction (mmmm): measured according to the method described above.

2) Syndiotactic pentad fraction (rrrr): measured according to the method described above.

3) Singular bond value (IV): measured according to the method described above. The threshold value of the apparatus used was 0.02 mol %.

4) Weight average molecular weight (Mw): measured according to the method described above.

5) Number average molecular weight (Mn): measured according to the method described above.

6) Melting point (Tm): measured according to the method described above.

7) Initial tensile resistance (unit: gf/d): tensile strength in the machine direction (MD) was measured in accordance with JIS L 1015 (1981). Some fibers were also measured at 80° C. The higher the initial tensile resistance, the higher the rigidity.

8) Average fiber diameter (unit: µm): five specimens were collected from web or non-woven fabric after spinning, which were then photographed under the electron microscope. One hundred fibers in the photograph were measured for their diameter, and their average diameter was referred to as the average fiber diameter.

9) Tenacity of non-woven fabric at 5% elongation (unit: kgf/5 cm): non-woven fabric having a width of 5 cm was subjected to tenacity measurement by use of a tensile strength testing machine equipped with a thermoregulator and under the conditions of a gripping space of 10 cm, a tensile speed of 100 mm/min, elongation of 5%. The tenacity of non-woven fabric was measured in the machine direction (MD). The measurement temperatures were 20° C. and 80° C. The thus-obtained tenacity was reduced to that of non-woven fabric having a basis weight of 20 g/m² (K), by the following expression:

$$K=(20/M) \times Y$$

wherein M represents the basis weight of non-woven fabric, and Y represents the tenacity at elongation of 5%.

10) Tenacity of non-woven fabric (unit: kgf/5 cm): non-woven fabric having a width of 5 cm was stretched to obtain a rupture tenacity by use of a tensile strength testing machine equipped with a thermoregulator and under the conditions of a gripping space of 10 cm, a tensile speed of 100 mm/min. The tenacity of non-woven fabric was measured in the machine direction (MD). The measurement was carried out at ambient temperature. Rupture tenacity was converted to that of non-woven fabric having a basis weight of 20 g/m² (K), by the following expression;

$$K=(20/M) \times Y$$

wherein M represents the basis weight of non-woven fabric, and Y represents tenacity at rupture.

11) Filtration accuracy (unit: μm): the housing of a circulation-type filtering testing machine was equipped with a cylindrical filter (250 mm), and water taken from a tank of 50 dm³ was pumped into and circulated through the filter. The flow rate was adjusted to 30 dm³, and then AC Fine Test Dusts (ACFTD; median diameter of 6.6–8.6 μm) were added as test powders to the tank at a rate of 0.5 g/min. The original solution (after 5 minutes) and filtered solutions were sampled and particle size distribution of each of the samples was measured by use of a light-blocking particle counter. Collection efficiency indicating an amount of particles collected by the filter was determined by use of measurement results of the particle size distribution. The particle size at which 99.9% of particles were collected was referred to as filtration accuracy of the filter.

12) Compressive strength (unit: kgf/cm²): the housing was equipped with a cylindrical filter (250 mm) in the above-described filtration accuracy test. AC Fine Test Dusts (ACFTD; median diameter of 6.6–8.6 μm) were added as test powders to the tank at a rate of 0.5 g/min and the difference in pressure between the intake side and exhaust side of the housing was measured. With continuing addition of the powder, compressive strength was defined as the pressure at which the difference in the pressure reached 10 (kgf/cm²) or which resulted in deformation of the filter.

13) Heat resistance: the cylindrical filter was dipped in warm water for treatment at 90° C. for two hours. After the treatment, a dimension of the filter was measured and the appearance was observed. Heat resistance was judged by standards as follows:

O; variance in dimension is 3 mm or less,

X; variance in dimension is more than 3 mm or strain, etc. are observed in the appearance.

14) Softness: ten panelists evaluated feeling of non-woven fabric having a basis weight of 20 g/m² by tactile sensation and classified the feeling into three categories, i.e., (1) soft: O (2) fair: Δ

(3) hard: X.

The result of the evaluation conducted by the ten panelists is referred to as an index for softness.

EXAMPLE 1

A stainless steel polymerization reactor having a capacity of 100 dm³ and equipped with tilted blades and a stirrer was purged with nitrogen. Subsequently, n-hexane (50 dm³), a toluene solution of methylaluminoxane (product of Tosoh Akuzo Co., tradename: MMAO, concentration: 2 mol/dm³) (7.6 mol as reduced to Al atoms), and a mixture of dimethylsilylene(2,3,5-trimethylcyclopentadienyl)(2'-4',5'-trimethylcyclopentadienyl)hafnium dichloride (1.48 mmol) as chiral metallocene and dimethylsilylene(2,3,5-trimethylcyclopentadienyl)(2',3',5'-trimethylcyclopentadienyl)hafnium dichloride as meso species to the above metallocene (0.05 mmol), along with toluene (1 dm³), were fed into the polymerization reactor at 20° C. The temperature in the reactor was elevated to 27° C. and hydrogen was fed thereto so that the hydrogen partial pressure at the gas phase in the reactor reached 0.04 MPa, followed by continuous feeding of propylene with the interior pressure of the reactor being maintained at 0.4 MPa, to thereby polymerize the propylene. Temperature in the reactor was maintained at 27° C. during polymerization. After completion of polymerization, unreacted propylene was removed from the reactor. 2-Propanol (3 dm³) was fed into the reactor and the mixture was stirred at 30° C. for 10 minutes so that the catalyst used was deactivated. Subsequently, an aqueous hydrochloric acid solution (concentration: 12 mol/dm³) (0.2 dm³) and methanol (8 dm³) were added to the mixture, followed by processing at 60° C. for 30 minutes. Thereafter, stirring was stopped and the aqueous phase was discarded from the lower part of the reactor. An aqueous solution of hydrochloric acid and methanol were added respectively in the same amounts and the similar procedure was repeated. An aqueous sodium hydroxide solution (concentration: 5 mol/dm³) (0.02 dm³), water (2 dm³), and methanol (2 dm³) were added thereto, and the resultant mixture was stirred at 30° C. for 10 minutes. After stirring was completed, the aqueous phase was discarded from the lower part of the reactor. Water (8 dm³) was further added and the mixture was stirred at 30° C. for 10 minutes. Thereafter, operation of removal of aqueous phase was repeated twice to obtain a polymer slurry, which was extracted from the reactor, filtered, and dried, to thereby obtain polypropylene to serve as a raw material of the fiber of the present invention.

By use of the obtained polypropylene, processing of fiber and non-woven fabric was performed through the following methods and physical properties of the obtained fiber were measured and evaluated.

Fiber was manufactured by use of an extruder, a spinning apparatus equipped with a spinneret having holes of 0.6 mm in diameter, a winding-up apparatus, etc., and a drawing apparatus equipped with a number of heating rolls and a stuffer box-type crimper. Non-woven fabrics hot-pressed at comparatively low temperature and non-woven fabric hot-pressed at comparatively high temperature were manufactured.

Unstretched fiber having a single fiber fineness of 3.2 d/f was obtained through spinning at an extruder spinning temperature of 280° C. and a spinning speed of 964 m/minute. The unstretched fiber was stretched at a stretching roll temperature of 40° C. and a stretching ratio 1.5, crimped by a crimper for 14 crimps/25 mm, and cut by a cutter to thereby obtain a fiber having a single fiber fineness of 2.2 d/f and a fiber length of 51 mm.

The fiber had a single fiber strength of 2.5 gf/d, elongation of 301%, and an initial tensile resistance of 21 gf/d. The fiber was carded by a carding machine at a carding speed of 20 m/minute to thereby obtain a web having a basis weight of 20 g/m$^2$. The web was hot-pressed at 136° C. by use of an embossing roll hot-pressing apparatus having a convex area portion of 24% to obtain a non-woven fabric. The tenacity of the non-woven fabric in the machine-direction was 7.61 kgf/5 cm. Similarly, the card web was hot-rolled at 142° C. to obtain a non-woven fabric. The machine direction tenacity of the non-woven fabric was 7.92 kgf/5 cm. Softness was satisfactory for both the non-woven fabric obtained at 136° C. and that obtained at 142° C.

As shown in the results, the fiber of Example 1 has comparatively high initial tensile resistance, and non-woven fabric using this fiber exhibits high tenacity when treated at high temperature. Evaluation results are shown in Table 1. Fuming that lowers spinability was not confirmed.

COMPARATIVE EXAMPLE 1

The procedure of Example 1 was performed at an initial (pre-polymerization) hydrogen partial pressure of 0.03 MPa and a polymerization temperature of 70° C. by use of a combination catalyst containing a titanium-on-magnesium chloride catalyst obtained through the same methods as employed in Example 1 of Japanese Patent Application Laid-Open (kokai) No. 62-104812 (3.3 mmol as reduced to Ti), triethylaluminum (100 mmol), and with diisopropyldimethoxysilane serving as the third catalyst component (10 mmol) instead of the catalyst used in Example 1 (combination of metallocene and methylaluminoxane), to thereby obtain polypropylene.

The thus-obtained polypropylene was subjected to a fiber-making process, and physical properties of the obtained fiber were measured and evaluated by the same methods as described in Example 1. The results show that the obtained fiber has a single fiber fineness of 2.2 d/f, a single fiber strength of 1.4 gf/d, elongation of 322%, and an initial tensile resistance of 10 gf/d. The fiber was treated by carding, hot-pressing, etc., to thereby obtain a non-woven fabric having a basis weight of 20 g/m$^2$. The machine direction tenacity of the non-woven fabric obtained at 136° C. was 6.30 kgf/5 cm and that of the non-woven fabric obtained at 142° C. was 4.39 kgf/5 cm. Softness was fair for the non-woven fabric obtained at 136° C., but the non-woven fabric obtained at 142° C. was hardened. Fuming in the vicinity of the spinneret was confirmed.

As shown in the results, the fiber of Comparative Example 1 has comparatively low initial tensile resistance, and tenacity of the non-woven fabric using the fiber decreases when treated at high temperature. Evaluation results are shown in Table 1.

COMPARATIVE EXAMPLE 2

The procedure of Comparative Example 1 was performed under the same conditions employed in Comparative Example 1, except that hydrogen partial pressure was 0.02 Mpa, to thereby obtain polypropylene, to which 1,3-bis(t-butyl-peroxyisopropyl)benzene was added in an amount of 0.01% to obtain a resin. By use of the obtained resin, processing of the fiber was performed and physical properties of the obtained fiber were measured and evaluated by methods similar to those described in Example 1.

The results show that the obtained fiber has a single fiber fineness of 2.2 d/f, a single fiber strength of 1.2 gf/d, elongation of 366%, and an initial tensile resistance of 9 gf/d. The fiber was treated by carding, hot-pressing, etc. to thereby obtain a non-woven fabric having a basis weight of 20 g/m$^2$. The machine direction tenacity of the non-woven fabric obtained at 136° C. was 6.30 kgf/5 cm and that of the non-woven fabric obtained at 142° C. was 2.11 kgf/5 cm. Softness was fair for the non-woven fabric obtained at 136° C., but the non-woven fabric obtained at 142° C. was hardened. Fuming was also confirmed.

As shown in the results, this fiber has comparatively low initial tensile resistance, and tenacity of the non-woven fabric made of the fiber decreases when the fabric is treated at high temperature. Evaluation results are shown in Table 1.

EXAMPLE 2

The polypropylene resin manufactured in Example 1 was subjected to a fiber-making process, and physical properties of the obtained fiber were measured and evaluated by the same methods as described in Example 1. In this Example, spinning was performed under the following conditions: the spinneret had holes of 0.65 mm in diameter, spinning temperature was 280° C., and spinning speed was 750 m/minute, to thereby obtain an unstretched fiber having a single fiber fineness of 12 d/f. The fiber was stretched at a stretching roll temperature of 110° C. and a stretching ratio of 5.8, to thereby obtain a fiber having a single fiber fineness of 2.1 d/f, a single fiber strength of 7.6 gf/d, elongation of 19%, and an initial tensile resistance of 39 gf/d. Since the initial tensile resistance of the fiber at 80° C. was 32 gf/d, the fiber exhibited a small decrease in initial tensile resistance at high temperature.

The fiber was treated by carding, hot-pressing, etc. to thereby obtain a non-woven fabric having a basis weight of 20 g/m$^2$. The machine direction tenacity of the non-woven fabric obtained at 136° C. was 8.47 kgf/5 cm and that of the non-woven fabric obtained at 142° C. was 8.61 kgf/5 cm. Evaluation results are shown in Table 1.

EXAMPLE 3

A stainless steel polymerization reactor having a capacity of 100 dm$^3$ and equipped with tilted blades and a stirrer was purged with nitrogen. Subsequently, a toluene solution of methylaluminoxane (product of Tosoh Akuzo Co., tradename: MMAO, concentration: 2 mol/dm$^3$) (11 mol as reduced to Al atoms) and hydrogen were fed thereto so that hydrogen partial pressure in the reactor at 20° C. became 0.11 MPa, and subsequently liquefied propylene (30 kg) was fed. Next, a toluene solution of methylaluminoxane (MMAO, product of Tosoh Akuzo Co., concentration: 2 mol/dm$^3$) (11 mol as reduced to Al atoms) and a mixture of dimethylsilylene(2,3,5-trimethylcyclopentadienyl)(2',4',5'-trimethylcyclopentadienyl)zirconium dichloride (0.033 mmol) as chiral metallocene and dimethylsilylene(2,3,5-trimethylcyclopentadienyl)(2',3',5'-trimethylcyclopentadienyl)zirconium dichloride as meso species to the above metallocene (0.002 mmol), along with toluene (0.1 dm$^3$), were fed with nitrogen pressure into the polymerization reactor at 20° C. to initiate polymerization of propylene. The temperature in the reactor was maintained at 30° C. during polymerization. After four hours from the initiation of polymerization, 2-Propanol (3 dm$^3$) was fed with pressure into the reactor to carry out an operation for stopping the polymerization reaction at 30° C. for five minutes, and then unreacted propylene was removed from the reactor. Subsequently, n-hexane (50 dm$^3$) was introduced to the reactor, and the same post-treatment as described in Example 1 was conducted to thereby obtain polypropylene.

By use of the obtained polypropylene, processing of non-woven fabric was performed through the following methods and physical properties of the obtained spun bond long fiber non-woven fabric were measured and evaluated.

A spun bond long fiber non-woven fabric was manufactured by use of a manufacturing apparatus for spun bond long fiber non-woven fabric equipped with an extruder, a spinneret having holes of 0.4 mm in diameter, an air-sucker type tractor, a net-conveyer type web-collector, a heater, a winding apparatus for non-woven fabric, etc. As the heater, there was used an apparatus equipped with an embossing roll hot-pressing apparatus having a convex area portion of 11%.

The spinning temperature was 230° C. and the traction speed of the air-sucker type tractor was 4091 m/minute. The obtained long fiber web had a single fiber fineness of 1.1 d/f and hot-press temperature of 142° C. The non-woven fabric having a basis weight of 20 g/m² showed a machine direction tenacity of 8.55 kgf/5 cm.

Also, the non-woven fabric exhibited a machine-direction 5% tensile strength of 2.70 kgf/5 cm at 25° C. and 2.43 kgf/5 cm at 80° C.

The non-woven fabric had an excellent 5% tensile strength at high temperature, softness, and a tenacity higher than that of the non-woven fabric of Example 1. Fuming that lowers spinability was not confirmed.

COMPARATIVE EXAMPLE 3

By use of polypropylene resin obtained in Comparative Example 1, processing of fiber and non-woven fabric was performed and physical properties thereof were measured and evaluated by the same methods as described in Example 2. In the Comparative Example, a stretching ratio of 4.6 was employed, since end breakage of single fiber occurred at a stretching ratio of 5.8. Thus, the obtained fiber exhibited a single fiber fineness of 2.6 d/f, a single fiber strength of 4.7 gf/d, elongation of 29%, and an initial tensile resistance of 29 gf/d. Since the initial tensile resistance at 80° C. was 17 gf/d, the fiber exhibited small decrease in initial tensile resistance at high temperature. The fiber was carded and the obtained web was hot-pressed to thereby obtain a non-woven fabric having a basis weight of 20 g/m². The machine direction tenacity of the non-woven fabric obtained at 136° C. was 7.20 kgf/5 cm and that of the non-woven fabric obtained at 142° C. was 3.49 kgf/5 cm. Softness was not satisfactory; both the non-woven fabric obtained at 136° C. and that obtained at 142° C. were hardened.

As shown in the results, this fiber has comparatively low initial tensile resistance, and tenacity and softness of the non-woven fabric made of the fiber are unsatisfactory. Evaluation results are shown in Table 1.

EXAMPLE 4

A micro-fine fiber non-woven fabric was manufactured by use of a melt blow manufacturing apparatus for non-woven fabric equipped with an extruder, a melt blow spinneret having holes of 0.3 mm in diameter, a net-conveyer type web-collector, a calender, a winding apparatus for non-woven fabric, etc.

The procedure of Example 1 was performed under the conditions employed in Example 1 except that hydrogen partial pressure was 0.15 Mpa, to thereby obtain a polypropylene resin, which was extruded through an extruder at a spinning temperature of 330° C. The resin extruded from the spinneret was sprayed to the web-collector of the net-conveyer through introduction with heated air (400° C., pressure 1.9 kgf/cm²), to obtain a micro-fine fiber web having a basis weight of approximately 20 g/m², through use of a melt blow method. Heated air sprayed with the web was discharged through suction by a high-speed air flow-suction discharger provided on the lower part of the net-conveyer. The web was melt-adhered by its own heat at spinning to form a non-woven fabric. Physical properties of the non-woven fabric are shown in Table 2.

COMPARATIVE EXAMPLE 4

A micro-fine fiber non-woven fabric was manufactured through methods similar to those of Example 4.

The manufacture is effected by use of a resin obtained through adding 1,3-bis(t-butyl-peroxyisopropyl)benzene in an amount of 0.022% to the polypropylene manufactured in Comparative Example 1. The resin was extruded through an extruder at a spinning temperature of 310° C. The resin extruded from the spinneret was sprayed to the web-collector of the net-conveyer through introduction with heated air (400° C., pressure 1.9 kgf/cm²), to obtain a micro-fine fiber web having a basis weight of approximately 25 g/m², through use of a melt blow method. Heated air sprayed with the web was discharged through suction by a high-speed air flow-suction discharger provided on the lower part of the net-conveyer. The web was melt-adhered by its own heat at spinning to form a non-woven fabric. Physical properties of the non-woven fabric are shown in Table 2.

EXAMPLE 5

Spinning of melt blow micro-fine fiber and forming a cylindrical filter were performed through a continuous method making use of an extruder, a melt blow spinneret having holes of 0.3 mm in diameter, a net-conveyer type web-collector, a through-air type heater, and a metal core-wound-type cylindrical filter-forming machine. The filter-forming machine was equipped with an infrared radiation heater.

Manufacture of the filter was effected by use of the polypropylene resin used at Example 4. The resin was extruded through an extruder at a spinning temperature of 305° C. The resin extruded from the spinneret was sprayed to the web-collector of the net-conveyer through introduction with heated air at 400° C. and varying pressure of 0.3–2.7 kgf/cm², to obtain a micro-fine fiber web having a basis weight of approximately 50 g/m², through use of a melt blow method. Heated air sprayed with the web was discharged through suction by a high-speed air flow-suction discharger provided on the lower part of the net-conveyer. Pressure of the heated air was sequentially varied so that the pressure at an inner layer side of one filter was low, that at an intermediate layer side was high, and that at an outer layer side was low, to thereby conduct melt blow spinning.

The web is a density-gradient type web wherein fiber diameter is large in the inner layer(s), small in the intermediate layer(s), and large in the outer layer(s). The web was heated at 152° C. by use of an air-through type heater; continuously wound around a metal core of the cylindrical filter-forming apparatus; and cooled when a specific outer diameter was attained. After the core was extracted, the wound web was cut to a specific dimension to thereby obtain a cylindrical filter wherein crossing points of fibers and interlayers of non-woven fabric melt-adhered. During formation of the filter heating to 152° C. was performed by use of the infrared radiation heater. The cylindrical filter has an inner diameter of 30 mm, an outer diameter of 70 mm, and a length of 250 mm.

Test results, such as filtration accuracy of the obtained cylindrical filter, are shown in Table 2.

COMPARATIVE EXAMPLE 5

By use of the polypropylene resin manufactured in Comparative Example 4, spinning and forming a cylindrical filter were performed through a continuous method similar to that of Example 5.

Test results, such as filtration accuracy of the obtained cylindrical filter, are shown in Table 2.

As shown in Table 2, a cylindrical filter formed of melt blow micro-fine fiber non-woven fabric obtained in Example 5 of the present invention has a smaller fiber diameter than does the filter of Comparative Example 5 manufactured by spinning under the same spinning conditions. Furthermore, the cylindrical filter of the present invention exhibited excellent filtration accuracy and heat resistance. It is estimated that the cylindrical filter of the present invention may be applied not only to uses at ambient temperature but also as filters for high-temperature filtration and filters for food or medical uses when subjected to heat sterilization.

In contrast, the cylindrical filter of Comparative Example 5 has a large fiber diameter and exhibited poor filtration accuracy and heat resistance. Since this filter has poor heat resistance, it was estimated to be inapplicable as filters for food and medical uses even after sterilization treatment.

EXAMPLE 6

A melt blow micro-fine fiber melt-adhered non-woven fabric was manufactured through a method similar to the above-described method of Example 4, by use of calender heat treatment instead of through-air heat treatment. A polypropylene resin similar to that of Example 4 was extruded through an extruder at a spinning temperature of 325° C. The resin extruded from the spinneret was sprayed to the web-collector of the net-conveyer through introduction with heated air (400° C., pressure 1.6 kgf/cm$^2$), to obtain a micro-fine fiber web having a basis weight of approximately 25 g/m$^2$, through a melt blow method. The web was continuously wound by a winding apparatus. The web was melt-adhered by its own heat at spinning to form a non-woven fabric.

The non-woven fabric-like material was heat-treated at 135° C. by use of a calendering apparatus to obtain a melt-adhered non-woven fabric having an average fiber diameter of 0.4 mm and a tenacity of 0.90 kgf/5 cm at 20° C. and a tenacity of 0.75 kgf/5 cm at 80° C. (reduced to a basis weight at 5% elongation of 20 g/m$^2$).

Since the non-woven fabric is porous and has a small fiber diameter and low heat resistance, it was estimated to be applicable to use as a battery separator. It is also estimated that the non-woven fabric may be used as filters, etc. as is or when subjected to post-processing such as winding or folding.

EXAMPLE 7

A cylindrical filter was formed by use of the non-woven fabric obtained in the above-described Example 6. The non-woven fabric was wound around a hollow supporting material formed of a porous heat-resistant resin to thereby obtain a cylindrical filter having an inner diameter of 30 mm, an outer diameter of 70 mm, and a length of 250 mm. The terminal part of non-woven fabric in the filter was caused to adhere by a heat-seal width of 4 mm.

The filter showed a filtration accuracy of 0.6 μm, a compressive strength of 10 or more, and excellent heat resistance.

As described above, the cylindrical filter of the present invention exhibited excellent filtration accuracy and heat resistance. It is estimated that the cylindrical filter of the present invention may be applied not only to uses at ambient temperature but also as filters for high-temperature filtration and filters for food or medical uses when subjected to heat sterilization.

EXAMPLE 8

A non-woven fabric containing spun bond long fibers was manufactured by the same method as that described in Example 3, through use of the same polypropylene resin as that obtained in Example 3. The resin was melt-extruded from an extruder through holes of the spinneret at a spinning temperature of 230° C. The thus-extruded resin was subjected to traction at 3214 m/min by an air-sucker type tractor, to thereby obtain fibers, and the fibers were sprayed with air on a net conveyer. The sprayed air was suction-discharged by an discharger disposed below the net conveyer. The thus-obtained long fiber web had a single fiber fineness of 1.4 d/f. Then, the long fiber web was subjected to hot pressing treatment at 142° C. by an emboss roll hot pressing machine, to thereby obtain a long fiber non-woven fabric in which fibers thermally adhered to each other. The non-woven fabric had a basis weight of 21 g/m$^2$ and a machine direction tenacity of 8.00 kgf/5cm calculated in terms of basis weight. Also, the non-woven fabric exhibited a tensile strength of 2.41 kgf/5 cm under 5% elongation in the machine direction at 25° C., and 2.24 kgf/5 cm under 5% elongation in the machine direction at 80° C.

This non-woven fabric exhibited excellent tensile strength under 5% elongation at high temperature.

COMPARATIVE EXAMPLE 6

The procedure of Comparative Example 2 was repeated, except that the amount of 1,3-bis-(t-butyl-peroxyisopropyl) benzene to be added during manufacture of polypropylene was 0.02%, to thereby obtain a resin. Through use of this resin, a non-woven fabric containing spun bond long fibers was manufactured by the same method as that of Example 3.

The resin was subjected to spinning at a spinning temperature of 230° C., and to traction at 1607 m/min by an air-sucker type tractor. The thus-obtained long fiber web had a single fiber fineness of 2.8 d/f. Also, the web was subjected to hot pressing at 142° C.

The non-woven fabric had a basis weight of 21 g/m$^2$ and a machine-direction tenacity of 5.55 kgf/5 cm as calculated in terms of basis weight. Also, the non-woven fabric exhibited a tensile strength of 1.75 kgf/5 cm under 5% elongation in the machine direction at 25° C., and 1.23 kgf/5 cm under 5% elongation in the machine direction at 80° C. This non-woven fabric exhibited an inferior tensile strength to that in Example 8 above, under 5% elongation at high and low temperatures. Especially at high temperatures, this non-woven fabric exhibited lowered tensile strength under 5% elongation.

EXAMPLE 9

The manufacturing method used in Example 1 was performed, except that a multi-component spinning apparatus comprising two extruders and a core-shell type multi-component spinneret having holes of 0.6 mm in diameter was used as a multi-component spinning apparatus, so as to manufacture thermal melt-adhesion composite fibers. The polypropylene resin manufactured in Example 1 was used as a shell component, and polyethylene terephthalate having a melting point of 255° C. was used as a core component. Spinning was performed at a spinning temperature of 305° C. and at a melt extrusion rate of 429 m/min, to thereby obtain unstretched fibers of sheath-core type composite fiber in which the weight ratio of core component to sheath component was 4:6 (composite ratio) and which had a single fiber strength of 7.2 d/f. These fibers were stretched under the conditions of a stretching roll temperature of 105° C. and a stretching ratio of 4.1; crimps of 15 crimps/25 mm were formed thereon by a crimper; and the fibers were cut into short fibers each having a single fiber fineness of 1.8 d/f and a fiber length of 51 mm. These fibers had a single fiber strength of 5.2 gf/d, elongation of 41%, and an initial tensile resistance of 43 gf/d.

These short fibers were subjected to carding, hot press treatment by an embossing roll hot pressing apparatus, and a like treatment as in Example 1, to thereby obtain two types of non-woven fabrics which underwent hot pressing at different temperatures.

One non-woven fabric, which underwent hot pressing at 136° C., had a basis weight of 20 g/m² and a machine direction tenacity of 6.50 kgf/5 cm. The other non-woven fabric, which underwent hot pressing at 142° C., had a basis weight of 20 g/m² and a machine direction tenacity of 6.85 kgf/5 cm.

The above-mentioned composite fibers exhibited thermal melt-adhesion under heat treatment at a temperature not lower than the softening point of the shell component and not higher than the melting point of the core component. Further, they had excellent single fiber strength and initial tensile resistance. In addition, thermal melt-adhesion non-woven fabrics made of these composite fibers exhibited high tenacity under both low and high temperature thermal treatments, and excellent softness. However, slight fuming was observed in the vicinity of spinneret.

EXAMPLE 10

Water absorptive articles were manufactured through use of the non-woven fabric obtained in Example 9, which had undergone hot press bonding at 136° C.

A disposable diaper for adults was used, with the surface material thereof alone was replaced with the non-woven fabric obtained in Example 7. The disposable diaper comprised an outer surface material which was a polypropylene spun bond non-woven fabric having a basis weight of 21 g/m², a water absorptive material containing pulp and high water absorptive resin, and a backing material made of polyethylene micro-porous film, wherein the water absorptive material was embraced by a pulp-made tissue paper. The surface material and the backing material were heat-sealed along their peripheral edges.

The surface material of this paper diaper was removed and the non-woven fabric obtained in Example 9 was superposed thereon instead. Three polyurethane elastic fibers in an extended state were interposed between the backing material and the surface material along the vicinity of each peripheral edge of the opening for a leg, and the peripheral edges of the inner and outer surface materials were caused to adhere to each other by hot pressing. The unnecessarily protruding portions of the surface material edges were excised by scissors, to thereby obtain a paper diaper using a non-woven fabric made of thermal melt-adhesion composite fibers. The leg opening portions of the diaper curved in the shape of a bow. The thus-manufactured paper diaper was an excellent disposable diaper for adults since it had high tenacity in its surface material. Further, the remarkable softness of the surface material of the paper diaper provided a soft touch.

COMPARATIVE EXAMPLE 7

A disposable diaper was manufactured by the same method used in Example 10, through use of the non-woven fabric obtained in Comparative Example 6. However, the thus-manufactured diaper was hard to the touch, since the non-woven fabric partially became film-like.

EXAMPLE 11

Composite monofilaments were manufactured by a composite monofilament manufacturing apparatus comprising two extruders and a core-shell type multi-component spinneret having holes of 1.0 mm in diameter, a hot water bath, and a drawing machine.

The polypropylene resin manufactured in Example 1 was used as a sheath component, and polyethylene terephthalate having a melting point of 255° C. was used as a core component. Spinning was performed in water at 34° C. at a spinning temperature of 300° C., to thereby obtain unstretched composite monofilaments having a single fiber fineness of 1750 d/f. These unstretched fibers were stretched under conditions of first and second stretchinging roll temperatures of 105° C., a hot water bath temperature of 96° C., and a stretching ratio of 7.0, to thereby manufacture composite monofilaments. The thus-obtained monofilaments had a weight ratio of core component to shell component of 4:6, a single fiber fineness of 251 d/f, a single fiber strength of 7.1 gf/d, elongation of 32%, and an initial tensile resistance of 46 gf/d. Further, these fibers exhibited an initial tensile resistance of 39 gf/d at 80° C.

These composite monofilaments had thermal melt-adhesivity; high strength; and excellent initial tensile resistance, especially at high temperatures.

COMPARATIVE EXAMPLE 8

Sheath-core type composite monofilaments were manufactured by the same method used in Example 11, through use of the polypropylene manufactured in Comparative Example 1 and the polyethylene terephthalate used in Example 11, under the same conditions of those in Example 11, including spinning temperature, composite ratio, and stretchinging condition.

These composite monofilaments had a single fiber fineness of 252 d/f, a single fiber strength of 4.3 gf/d, elongation of 52%, an initial tensile resistance of 31 gf/d at 20° C., and an initial tensile resistance of 22 gf/d at 80° C.

These composite monofilaments had low strength and poor initial tensile resistance at both ambient temperature and higher temperatures.

EXAMPLE 12

Through use of a net manufacturing apparatus comprising a weaving machine, a through-air type heater, and a like machine, a net in which fiber contact points were melt-adhered to each other under heat was manufactured as follows:

A net having a weaving density of 9 warps/50 mm and 9 wefts/50 mm was woven through use of the monofilaments obtained in Example 11 as warps and wefts. The net was heated to 155° C., to thereby manufacture a net in which fiber contact points were melt-adhered to each other under heat. The weaving and the thermal treatment for thermal melt-adhesion were performed consecutively.

The thus-obtained net had a machine-direction tenacity of 9.75 kgf/5 cm.

It is considered that the net could be advantageously used as intermediate materials such as agricultural house cover materials, and protective nets and filters for civil engineering use.

COMPARATIVE EXAMPLE 9

A net was manufactured by the same method used in Example 12.

The thus-obtained net had a machine-direction tenacity of 5.85 kgf/5cm.

Since the net in this Comparative Example had low tenacity, the net is not considered to be applicable to use for materials such as construction materials requiring high tenacity, and agricultural greenhouse covers which are repeatedly used over a long period of time, being installed, removed and otherwise.

TABLE 1(1/2)

| Examples and Comparative Examples | Example 1 | Example 2 | Example 9 | Example 11 |
|---|---|---|---|---|
| Physical properties | | | | |
| 1) Isotactic fraction (mmmm) | 0.974 | 0.974 | 0.974 | 0.974 |
| 2) Syndiotactic fraction (rrrr) | 0.001 | 0.001 | 0.001 | 0.001 |
| 3) Singular bond (mol %) | 0.03 | 0.03 | 0.03 | 0.03 |
| 4) Terminal double bond | ND | ND | ND | ND |
| 5) Weight average molecular weight ($Mw \times 10^{-1}$) | 21.8 | 21.8 | 21.8 | 21.8 |
| 6) Molecular weight distribution (Mw/Mn) | 2.4 | 2.4 | 2.4 | 2.4 |
| Evaluation | | | | |
| Melting point (° C.) | 163.6 | 163.6 | 163.6 | 163.6 |
| Properties of fiber | | | | |
| Fineness (d/f) | 2.2 | 2.1 | 1.8 | 251 |
| Single yarn strength (gf/d) | 2.5 | 7.6 | 5.2 | 7.1 |
| Initial tensile resistance (gf/d) | 21 | 39 | 43 | 46 |
| Initial tensile resistance (gf/d: 80° C.) | — | 32 | — | 39 |
| Properties of Non-woven fabric | | | | |
| Tenacity (kgf/5 cm: Process Temp. 136° C.) | 7.61 | 8.47 | 6.50 | — |
| Tenacity (kgf/5 cm: Process Temp. 142° C) | 7.92 | 8.61 | 6.85 | — |
| Softness (Process Temp. 136° C.) | ○ | ○ | ○ | — |
| Softness (Process Temp. 142° C.) | ○ | ○ | ○ | — |
| Fuming | None | None | Slight | Slight |

TABLE 1(2/2)

| Examples and Comparative Examples | Comparative Example 1 | Comparative Example 2 | Comparative Example 3 | Comparative Example 8 |
|---|---|---|---|---|
| Physical properties | | | | |
| 1) Isotactic fraction (mmmm) | 0.954 | 0.955 | 0.954 | 0.954 |
| 2) Syndiotactic fraction (rrrr) | 0.005 | 0.005 | 0.005 | 0.005 |
| 3) Singular bond (mol %) | ND | ND | ND | ND |
| 4) Terminal double bond | ND | ND | ND | ND |
| 5) Weight average molecular weight (Mw × $10^{-1}$) | 21.6 | 19.9 | 21.6 | 21.6 |
| 6) Molecular weight distribution (Mw/Mn) | 5.4 | 2.5 | 5.4 | 5.4 |
| Evaluation | | | | |
| Melting point (° C.) | 165.0 | 164.5 | 165.0 | 165.0 |
| Properties of fiber | | | | |
| Fineness (d/f) | 2.2 | 2.2 | 2.6 | 252 |
| Single yarn strength (gf/d) | 1.4 | 1.2 | 4.7 | 4.3 |
| Initial tensile resistance (gf/d) | 10 | 9 | 28 | 31 |
| Initial tensile resistance (gf/d: 80° C.) | — | — | 17 | 22 |
| Properties of Non-woven fabric | | | | |
| Tenacity (kgf/5 cm: Process Temp. 136° C.) | 6.30 | 6.30 | 7.20 | — |
| Tenacity (kgf/5 cm: Process Temp. 142° C) | 4.39 | 2.11 | 3.49 | — |
| Softness (Process Temp. 136° C.) | Δ | Δ | X | — |
| Softness (Process Temp. 142° C.) | X | X | X | — |
| Fuming | Occurred | Occurred | Occurred | Occurred |

TABLE 2(1/2)

| Examples and Comparative Examples | Example 4 | Example 5 | Example 6 | Example 7 |
|---|---|---|---|---|
| Physical properties | | | | |
| 1) Isotactic fraction (mmmm) | 0.962 | 0.962 | 0.962 | 0.962 |
| 2) Syndiotactic fraction (rrrr) | 0.002 | 0.002 | 0.002 | 0.002 |
| 3) Singular bond (mol %) | 0.09 | 0.09 | 0.09 | 0.09 |
| 4) Terminal double bond | ND | ND | ND | ND |
| 5) Weight average molecular weight (Mw × $10^{-1}$) | 13.8 | 13.8 | 13.8 | |
| 6) Molecular weight distribution (Mw/Mn) | 2.0 | 2.0 | 2.0 | 2.0 |
| Evaluation | | | | |
| Melting point (° C.) | 161.9 | 161.9 | 161.9 | 161.9 |
| Fiber diameter (μm) | 1.5 | — | 0.4 | 0.6 |
| Properties of non-woven fabric | | | | |
| Tenacity (kgf/5 cm: extension 5%, 25° C.) | 1.65 | — | 0.90 | — |
| Tenacity (kgf/5 cm: extension 5%, 80° C.) | 1.59 | — | 0.75 | — |
| Properties of filter | | | | |
| Inner layer fiber diameter (μm) | — | 7.8 | — | 0.4 |
| Intermediate layer fiber diameter (μm) | — | 0.8 | — | 0.4 |

TABLE 2(1/2)-continued

| Examples and Comparative Examples | Example 4 | Example 5 | Example 6 | Example 7 |
|---|---|---|---|---|
| Outer layer fiber diameter (μm) | — | 8.8 | — | 0.4 |
| Filtering accuracy | — | 1 | — | 0.6 |
| Compressive strength (kgf/cm²) | — | 10 or more | — | 10 or more |
| Heat resistance | ○ | ○ | ○ | ○ |

TABLE 2(2/2)

| Examples and Comparative Examples | Comparative Example 4 | Comparative Example 5 |
|---|---|---|
| Physical properties | | |
| 1) Isotactic fraction (mmmm) | 0.955 | 0.955 |
| 2) Syndiotactic fraction (rrrr) | 0.005 | 0.005 |
| 3) Singular bond (mol %) | ND | ND |
| 4) Terminal double bond | ND | ND |
| 5) Weight average molecular weight (Mw × 10⁻¹) | 14.2 | 14.2 |
| 6) Molecular weight distribution (Mw/Mn) | 2.5 | 2.5 |
| Evaluation | | |
| Melting point (° C.) | 164.5 | 164.5 |
| Fiber diameter (μm) | 1.53 | — |
| Properties of non-woven fabric | | |
| Tenacity (kgf/5 cm: extension 5%, 25° C.) | 1.31 | — |
| Tenacity (kgf/5 cm: extension 5%, 80° C.) | 0.92 | — |
| Properties of filter | | |
| Inner layer fiber diameter (μm) | — | 15.9 |
| Intermediate layer fiber diameter (μm) | — | 5.1 |
| Outer layer fiber diameter (μm) | — | 16.4 |
| Filtering accuracy | — | 8 |
| Compressive strength (kgf/cm²) | — | 10 or more |
| Heat resistance | Poor | Poor |

TABLE 3

| Examples and Comparative Examples | Example 3 | Example 8 | Comparative Example 6 |
|---|---|---|---|
| Physical properties | | | |
| 1) Isotactic fraction (mmmm) | 0.962 | 0.962 | 0.954 |
| 2) Syndiotactic fraction (rrrr) | 0.002 | 0.002 | 0.005 |
| 3) Singular bond (mol %) | 0.09 | 0.09 | ND |
| 4) Terminal double bond | ND | ND | ND |
| 5) Weight average molecular weight (Mw × 10⁻¹) | 19.0 | 19.0 | 19.9 |
| 6) Molecular weight distribution (Mw/Mn) | 2.0 | 2.0 | 2.5 |
| Evaluation | | | |
| Melting point (° C.) | 161.9 | 161.9 | 164.5 |
| Fineness (d/f) | 1.1 | 1.4 | 2.8 |
| Properties of non-woven fabric | | | |
| Tenacity (kgf/5 cm: extension 5%, 25° C.) | 2.70 | 2.41 | 1.75 |
| Tenacity (kgf/5 cm: extension 5%, 80° C.) | 2.43 | 2.24 | 1.23 |
| Tenacity (kgf/5 cm: extension 5%, 142° C.) | 8.55 | 8.00 | 5.55 |

INDUSTRIAL APPLICABILITY

The fiber of the present invention exhibits excellent heat resistance during a melt-adhesion process, particularly when used in fiber-processed products. Heat resistance of the fiber of the present invention may be improved while maintaining effects induced by addition of polypropylene due to use of specific polypropylene as a raw material, as compared with conventional fiber which contains conventional polypropylene at the same proportion. For example, the fiber of the present invention may be applied to filters requiring heat resistance for which use of conventional polypropylene fiber has been limited. Furthermore, tenacity and softness of non-woven fabric made of the fiber are so excellent that the fiber of the present invention is suited for surface materials of sanitary napkins, disposable paper diapers, etc., and has extensive applicability as compared with fiber which contains conventional polypropylene.

What is claimed is:

1. A fiber formed from a polypropylene serving as at least one raw material, wherein the polypropylene has
    (a) an isotactic pentad fraction (mmmm) of 0.950–0.995,
    (b) a syndiotactic pentad fraction (rrrr) of 0–0.004,
    (c) different bonds due to 2,1-insertion reaction and 1,3-insertion reaction in an amount of 0–0.3 mol %, and
    (d) absence of terminal double bonds, each of which was confirmed with NMR spectrometry, and has
    (e) a weight average molecular weight (Mw) of 50,000–1,000,000 and
    (f) a ratio (Mw/Mn) of weight average molecular weight (Mw) to number average molecular weight of 1.5 to 3.8, said polypropylene being manufactured through the use of a chiral transition metal compound represented by the following formula

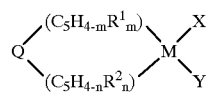

wherein each of $C_5H_{4-m}$ and $C_5H_{4-n}R^2_n$ represents a substituted cyclopentadienyl group; each of m and n represents an integer of 1–3; each of $R^1$ and $R^2$, which may be identical to or different from each other, represents a $C_{1-20}$ hydrocarbon group; a silicon-containing hydrocarbon group, or a hydrocarbon group bonding to two carbon atoms contained in the cyclopentadienyl ring thereby to form one or more hydrocarbon rings which may have ring hydrogen further substituted with a hydrocarbon group; Q represents a group that can be cross-linked with $C_5H_{4-m}$, $R^1_m$ and $C_5H_{4-n}R^2_n$, non-substituted silylene, or hydrocarbon-substituted silylene group; M represents a transition metal selected from a group of titanium, zirconium, and hafnium; and each of X and Y, which may be identical to or different from each other, represents hydrogen, a halogen, or a hydrocarbon group, as catalyst in the presence of hydrogen.

2. A fiber according to claim 1, wherein the polypropylene has (a) an isotactic pentad fraction (mmmm) of 0.960–0.995, (b) a syndiotactic pentad fraction (rrrr) of 0–0.004, and (c) different bonds due to 2,1-insertion reaction and 1,3-insertion reaction in an amount of 0–0.2 mol %.

3. A fiber according to claim 2 wherein the fiber is a composite fiber containing polypropylene as one component.

4. A non-woven fabric in which the fiber according to claim 2 is employed.

5. A knit fabric in which the fiber according to claim 2 is employed.

6. A filter in which the fiber according to claim 2 is employed.

7. A fiber according to claim 1, wherein the polypropylene is manufactured through use of at least one catalyst selected from among dimethylsilylene(2,3,5-trimethylcyclopentadienyl)(2', 4',5'-trimethylcyclopentadienyl)hafnium dichloride and dimethylsilylene(2,3,5-trimethylcyclopentadienyl)(2',4',5'-trimethylcyclopentadienyl)zirconium dichloride.

8. A fiber according to claim 7 wherein the fiber is a composite fiber containing polypropylene as one component.

9. A fiber according to claim 1, wherein the polypropylene has a melting point of 160–168° C.

10. A fiber according to claim 9 wherein the fiber is a composite fiber containing polypropylene as one component.

11. A fiber according to claim 1 wherein the fiber is a composite fiber containing polypropylene as one component.

12. A non-woven fabric in which the fiber according to claim 1 is employed.

13. A non-woven fabric according to claim 12, wherein the non-woven fabric is long-fiber non-woven fabric obtained through a spun bond method.

14. A filter in which the non-woven fabric according to claim 13 is employed.

15. An absorptive article partially using the non-woven fabric according to claim 7.

16. A non-woven fabric according to claim 12, wherein the non-woven fabric is long-fiber non-woven fabric obtained through a melt blow method.

17. A filter in which the non-woven fabric according to claim 12 is employed.

18. An absorptive article partially using the non-woven fabric according to claim 12.

19. A knit fabric in which the fiber according to claim 1 is employed.

20. A filter in which the fiber according to claim 1 is employed.

* * * * *